United States Patent
Tsutsui et al.

(10) Patent No.: US 8,151,176 B2
(45) Date of Patent: Apr. 3, 2012

(54) CPU INSTRUCTION RAM PARITY ERROR PROCEDURE

(75) Inventors: Greg Tsutsui, San Jose, CA (US);
Justin Jones, Mountain View, CA (US)

(73) Assignee: LSI Corporation, Milpitas, CA (US)

( * ) Notice: Subject to any disclaimer, the term of this patent is extended or adjusted under 35 U.S.C. 154(b) by 811 days.

(21) Appl. No.: 12/270,225

(22) Filed: Nov. 13, 2008

(65) Prior Publication Data
US 2010/0122150 A1    May 13, 2010

(51) Int. Cl.
*G06F 11/00* (2006.01)
(52) U.S. Cl. .................. 714/801; 714/802; 714/758
(58) Field of Classification Search .............. 714/801, 714/802, 758, 763, 700, 474, 56
See application file for complete search history.

(56) References Cited

U.S. PATENT DOCUMENTS 4,774,712 A * 9/1988 Lewis ........................ 714/802
5,515,381 A * 5/1996 Chan ........................... 714/758

* cited by examiner

*Primary Examiner* — Fritz Alphonse
(74) *Attorney, Agent, or Firm* — Clark Hill PLC

(57) ABSTRACT

A parity checking circuit which includes a microprocessor, instruction memory, a parity checker, an address capture device, a data bus connected to the microprocessor, the instruction memory and the parity checker, and an address bus connected to the microprocessor, the instruction memory and the address capture device. The instruction memory sends a parity bit to the parity checker, and the parity checker compare an address it receives from the address bus to the parity bit it receives from the instruction memory. If a parity error is detected, an error signal is sent to the address capture device and the address capture device captures the address for subsequent storage in a storage device, such as flash memory. The circuit also includes registers and a watchdog reset device which facilitates a system level reset at the command of the microprocessor.

15 Claims, 2 Drawing Sheets

CPU INSTRUCTION RAM PARITY ERROR PROCEDURE

BACKGROUND OF THE INVENTION

The present invention generally relates to methods for checking and keeping track of parity errors with regard to memory address locations.

Parity checking is an error detection technique that tests the integrity of digital data in memory. Parity checking adds an extra parity cell to each byte of memory and an extra parity bit to each byte transmitted. The value of the ninth bit (0 or 1) depends on the pattern of the byte's eight bits. Each time a byte is transferred or transmitted, the parity bit is tested by memory controller circuits on the motherboard.

"Even" parity systems make the parity bit 1 when an even number of 1 bits are in the byte, while "odd" parity systems make the parity bit 1 when an an odd number of 1 bits are present. Parity checking cannot detect the condition in which two data bits are in error, because they cancel themselves— I . . . , the parity bit would still be correct for that sequence of 0s and 1s.

The present invention is directed at an improved method and device for checking and keeping track of parity errors with regard to memory address locations.

SUMMARY OF AN EMBODIMENT OF THE INVENTION

Briefly, an embodiment of the present invention provides a parity checking circuit which includes a microprocessor, instruction memory, a parity checker, an address capture device, a data bus connected to the microprocessor, the instruction memory and the parity checker, and an address bus connected to the microprocessor, the instruction memory and the address capture device. The instruction memory sends a parity bit to the parity checker, and the parity checker compare an address it receives from the address bus to the parity bit it receives from the instruction memory. If a parity error is detected, an error signal is sent to the address capture device and the address capture device captures the address for subsequent storage in a storage device such as flash memory. Preferably, the circuit also includes registers and a watchdog reset device which facilitates a system level reset at the command of the microprocessor.

BRIEF DESCRIPTION OF THE DRAWINGS

The organization and manner of the structure and operation of the invention, together with further objects and advantages thereof, may best be understood by reference to the following description, taken in connection with the accompanying drawings, wherein.

DETAILED DESCRIPTION OF A SPECIFIC EMBODIMENT OF THE INVENTION

Figure 1:
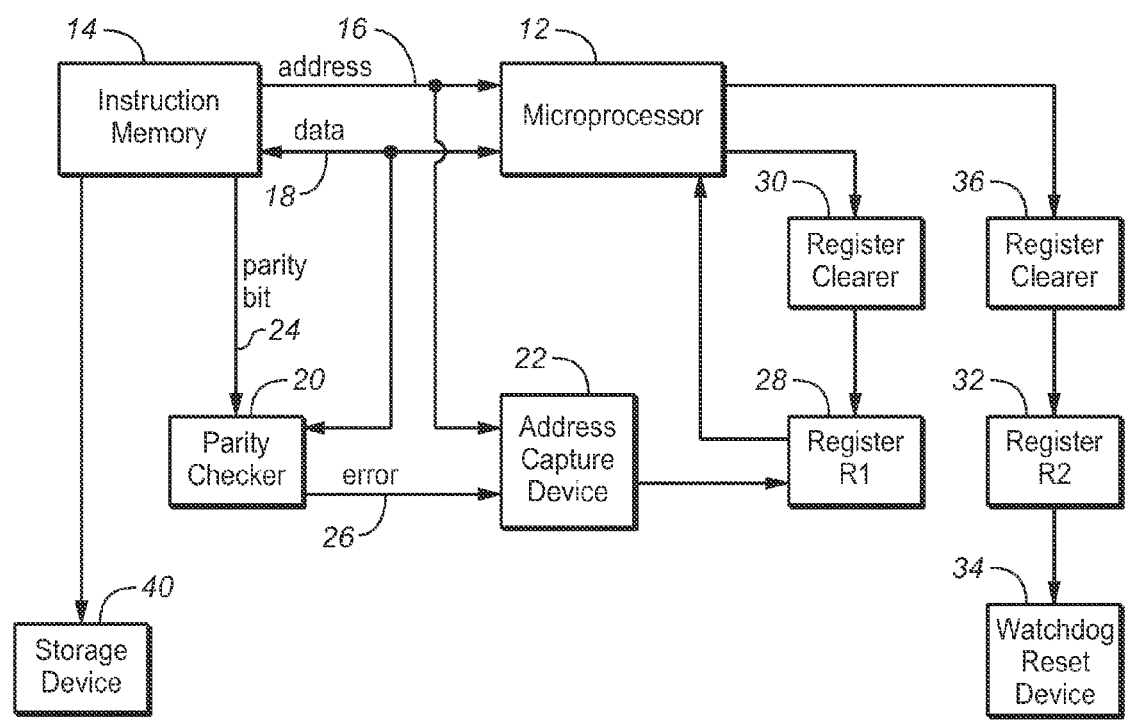
FIG. 1 provides a block circuit diagram of a circuit which is in accordance with an embodiment of the present invention.

While the invention may be susceptible to embodiment in different forms, there is shown in the drawings, and herein will be described in detail, a specific embodiment of the invention. The present disclosure is to be considered an example of the principles of the invention, and is not intended to limit the invention to that which is illustrated and described herein.

FIG. 1 illustrates, in block diagram form, a circuit 10 which is in accordance with an embodiment of the present invention. The circuit 10 checks for a parity error, and if a parity error is detected, the circuit 10 identifies the memory address at which the parity error occurred and keeps track of how many times a parity error has occurred at that memory address.

As shown, the circuit 10 includes a microprocessor or central processing unit 12, and code (i.e., firmware) runs on the microprocessor. The microprocessor 12 fetches instructions from instruction memory 14 via an address bus 16 and a read data bus 18. Specifically, the microprocessor 12 receives an address from the instruction memory 14 along the address bus 16, and receives data from the instruction memory 14 along the read data bus 18. In addition, a parity checker 20 receives the data from the read data bus 18, and an address capture device 22 receives the address from the address bus 16. The parity checker 20 also receives a parity bit 24 from the instruction memory 14, and is configured to compare the address it receives from the address bus 16 to the parity bit it receives from the instruction memory 14, and determine whether or not there is a parity error. If there is a parity error, the parity checker 20 generates an error signal 26 and sends it to the address capture device 22. The address capture device 22 is configured to capture the address (that it receives from the address bus 16), whenever the address capture device 22 receives an error signal from the parity checker 20. As such, whenever there is a parity error, the address capture device 22 captures the address associated with the error.

The address capture device 22 is in communication with a register 28 (Register "R1"). The register 28 has a byte length which is at least one bit wider than the byte length of the address bus 16. The extra bit(s) is/are used for a default value. The default value is selected such that it cannot be a value on the address bus. The microprocessor 12 is in communication with the register 28 and can read its contents, and the circuit 10 includes a register clearer device 30 which is configured to send a signal to the register 28 to clear its contents after the microprocessor 12 reads the contents of the register 28.

The circuit includes another register 32 (Register "R2"), and the microprocessor 12 can write to this register 32. The circuit 10 also includes a watchdog reset device 34 which is in communication with the register 32. The watchdog reset device 34 is configured to initiate a system level reset, ultimately at the command of the microprocessor 12. Specifically, the microprocessor 12 checks the contents of register 28 and if the one or more extra bits contain a value which differs from the default value, the microprocessor 12 instructs register 32 to have the watchdog reset device 34 initiate a system level reset. Register 32 has three bits—0, 1 and 2. Bit 0 is set when the microprocessor 12 initiates a reset. Bit 1 is set when a timer goes off and the watchdog reset device 34 resets the chip. Bit 3 is set when a parity error is detected on the instruction memory 14, and the watchdog reset device 34 resets the chip. The circuit 10 includes a register clearer device 36 which is configured to send a signal to the register 32 to clear its contents after the contents have been read out by the watchdog reset device 34.

In addition to instructing register 32 to have the watchdog reset device 34 initiate a system level reset, when the microprocessor 12 determines that one or more of the extra bits of register 28 a contain a value which differs from the default value, the microprocessor 12 also writes the value of register 28 to a storage device 40, such as external flash memory. Preferably, one location of the storage device 40 is set aside for the address associated with a parity error, and another location holds a count of the number of times an error has occurred. Specifically, the count preferably identifies how many times in a row this address has caused a parity error and a reboot.

On the other hand, if the microprocessor 12 determines that one or more of the extra bits of register 28 a contain a value which is the same as the default value, the microprocessor 12 boots normally, and does not update the storage device 40 with the value of register 28.

Figure 2:
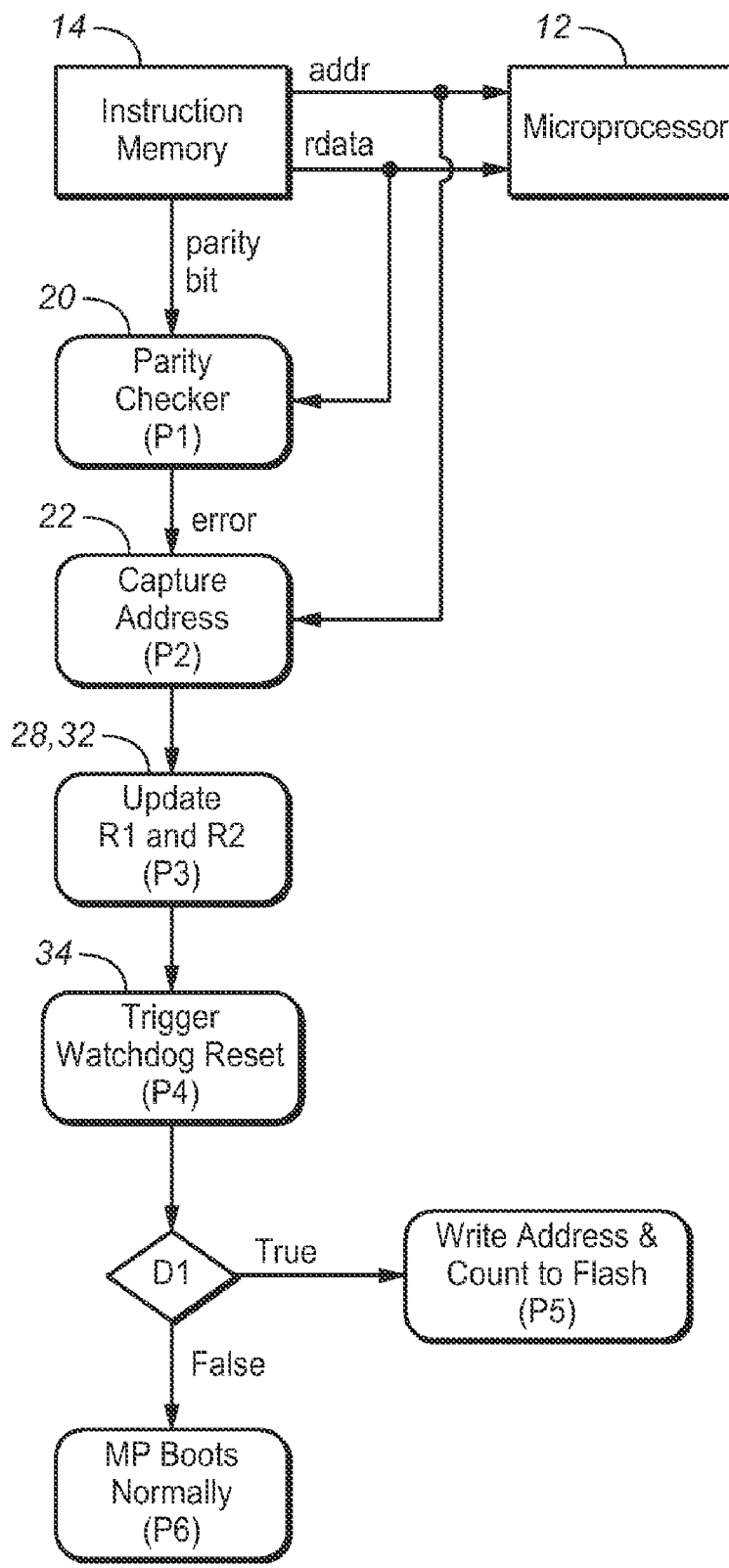
FIG. 2 provides a flow chart which illustrates the steps of operation of the circuit shown in FIG. 1.

The different states of operation of the circuit 10 will be discussed again with reference to the flow chart shown in FIG. 2. The microprocessor 12 fetches instructions from the instruction memory 14, along the address bus 16 and the read data bus 18. The parity checker 20 also receives the data from the data bus 18 and a parity bit 24 from the instruction memory 14. In state P1, the parity checker 20 determines if there is a parity error or not. If there is an error, the parity checker 20 generates an error signal 26 and provides it to the address capture device 22, in which case the address capture device 22 captures the address (state P2) from the address bus 16. In state P3 the two registers 28 and 32 are updated, and in state P4 the watchdog reset device 34 is triggered, causing a system level reset.

The microprocessor 12 decides, at state D1, whether the register 28 contains the default value or some other value. If the register 28 contains a value other than the default value, state P5 provides that the microprocessor 12 writes the value of the register 28 to storage device 40, such as to external flash memory. On the other hand, if register is 28 contains a value that is the same as the default value, the microprocessor 12 effects a normal boot (state P6), as there is no need to write the value of the register 28 to the storage device 40 in such a situation.

While an embodiment of the present invention is shown and described, it is envisioned that those skilled in the art may devise various modifications to the embodiment without departing from the spirit and scope of the present invention.

What is claimed is:

1. A parity checking circuit comprising: a microprocessor; instruction memory; a parity checker; an address capture device; a data bus connected to the microprocessor, the instruction memory and the parity checker; an address bus connected to the microprocessor, the instruction memory and the address capture device, wherein the instruction memory is configured to send a parity bit to the parity checker, wherein the address bus is configured to send an address to the parity checker, wherein the parity checker is configured to compare the address which the parity checker receives from the address bus to the parity bit which the parity checker receives from the instruction memory, and determine whether or not there is a parity error, wherein the parity checker is configured to send an error signal to the address capture device if a parity error is detected, wherein the address capture device is configured to capture an address that the address capture device receives from the address bus, whenever the address capture device receives the error signal from the parity checker.

2. A parity checking circuit as recited in claim 1, further comprising a register in communication with the address capture device and the microprocessor.

3. A parity checking circuit as recited in claim 1, wherein the microprocessor is configured to check contents of the register and initiate a system level reset depending on the contents of the register.

4. A parity checking circuit as recited in claim 1, wherein the register has a byte length which is one bit wider than a byte length of the address bus.

5. A parity checking circuit as recited in claim 1, further comprising a register in communication with the address capture device and the microprocessor, wherein the register has an extra bit compared to the address bus, and the extra bit is configured to store a default value when there is no parity error.

6. A parity checking circuit as recited in claim 1, further comprising a first register in communication with the address capture device and the microprocessor, and a second register in communication with the microprocessor, wherein the microprocessor is configured to check contents of the first register and use the second register to initiate a system level reset depending on the contents of the first register.

7. A parity checking circuit as recited in claim 6, further comprising a watchdog reset device, wherein the second register is configured to communicate with the watchdog reset device and initiate the system level reset.

8. A parity checking circuit as recited in claim 1, further comprising a first register in communication with the address capture device and the microprocessor, wherein the first register has an extra bit compared to the address bus, and the extra bit is configured to store a default value when there is no parity error, and a second register in communication with the microprocessor, wherein the microprocessor is configured to check the extra bit of the first register and use the second register to initiate a system level reset depending on the extra bit.

9. A parity checking circuit as recited in claim 8, further comprising a watchdog reset device, wherein the second register is configured to communicate with the watchdog reset device and initiate a system level reset.

10. A parity checking circuit as recited in claim 1, further comprising a storage device to which the microprocessor sends information regarding parity errors.

11. A parity checking circuit as recited in claim 10, wherein the storage device stores a count of the number of times a parity error has occurred with regard to a memory address.

12. A parity checking circuit as recited in claim 10, wherein the storage device comprises flash memory.

13. A parity checking circuit as recited in claim 8, wherein the microprocessor is configured to receive the address from the address capture device, and send the address to a storage device.

14. A parity checking circuit as recited in claim 13, wherein the storage device stores a count of the number of times a parity error has occurred with regard to a memory address.

15. A parity checking circuit as recited in claim 13, wherein the storage device comprises flash memory.

* * * * *